United States Patent [19]

Symes et al.

[11] Patent Number: 4,705,825

[45] Date of Patent: Nov. 10, 1987

[54] POLYMERIC PRODUCTS AND THEIR PRODUCTION

[75] Inventors: Kenneth C. Symes, Keighley; John Langley, Shipley; Kishor K. Mistry, Bradford, all of England

[73] Assignee: Allied Colloids Limited, Bradford, England

[21] Appl. No.: 827,960

[22] PCT Filed: Jun. 28, 1985

[86] PCT No.: PCT/GB85/00287

§ 371 Date: Feb. 4, 1986

§ 102(e) Date: Feb. 4, 1986

[87] PCT Pub. No.: WO86/00315

PCT Pub. Date: Jan. 16, 1986

[30] Foreign Application Priority Data

Jun. 28, 1984 [GB] United Kingdom ............... 8416455

[51] Int. Cl.[4] .................... C08J 3/02; C08G 83/00
[52] U.S. Cl. .................................... 524/732; 524/733; 524/734; 527/300; 527/312; 527/313; 527/314
[58] Field of Search ............... 524/732, 733, 734; 525/54.3, 54.31, 54.32; 527/300, 311, 312, 313, 314

[56] References Cited

U.S. PATENT DOCUMENTS

| 3,640,925 | 2/1972 | Touzinsky et al. | 524/734 |
| 3,966,696 | 6/1976 | Kidoh et al. | 524/734 |
| 4,322,472 | 3/1982 | Kaspar et al. | 527/314 |
| 4,552,938 | 11/1985 | Mikita et al. | 524/812 |

FOREIGN PATENT DOCUMENTS 580020 8/1946 United Kingdom.
1490128 10/1977 United Kingdom.

Primary Examiner—John Kight
Assistant Examiner—Nathan M. Nutter
Attorney, Agent, or Firm—Jenner & Block

[57] ABSTRACT

A particulate substantially homogeneous polymeric product is made by dispersing ungelatinised polysaccharide in aqueous monomer containing polymerization initiator, initiating polymerization and thereby inducing exothermic polymerization, utilizing the exotherm to provide part at least of the heat necessary to gelatinise the polysaccharide and thereby producing a comminutable gel comprising polymerized monomer and gelatinised polysaccharide, comminuting the gel and drying the comminuted gel. The product generally comprises a blend of water soluble synthetic polymer, gelatinised polysaccharide having a low degree of graft polymerization and optionally gelatinised polysaccharide. Products comprising these components are particularly suitable for use as wallpaper adhesives.

19 Claims, No Drawings

POLYMERIC PRODUCTS AND THEIR PRODUCTION

It is known to make substantially homogeneous polymeric products comprising units of polymerised ethylenically unsaturated monomer and polysaccharide units (often gelatinised polysaccharide units) by polymerising the monomer in the presence of the polysaccharide.

Depending upon the process conditions it is possible for the product to include homopolymer together with a graft polymer of the monomer and the polysaccharide but, as explained in U.S. Pat. Nos. 3,332,897 and 4,322,472, the presence of substantial amounts of the homopolymer has generally been regarded as undesirable. Accordingly the normal procedure has been to conduct the polymerisation in the presence of initiators such as ceric or other multivalent ion that will promote graft polymerisation rather than homopolymerisation. For instance in U.S. Pat. Nos. 3,332,897 polymerisation is conducted in the presence of ceric ion. In U.S. Pat. No. 4,322,472 polymerisation is conducted in the presence of cupric or ferric salts. In a comparative example it is shown that when polymerising in the presence of large amounts of sodium nitrate together with ammonium persulphate and sodium metabisulphite the addition of cupric or ferric salt reduces the solution viscosity, indicating reduced amounts of homopolymerisation. However even in the comparative example in which cupric and ferric or other polyvalent metal salt is not used the solution viscosity is still very low (a 45% solution having a viscosity of 4,000 cps measured on a Brookfield viscometer no. 2 spindle, 10 rpm 90° C.).

The polysaccharide is generally ungelatinised before the polymerisation and so polymerisation can be conducted on an aqueous dispersion of ungelatinised polysaccharide particles in aqueous monomer. Generally the temperature of the reaction mixture is held below the gelatinisation temperature. Thus in U.S. Pat. No. 3,332,897 (that utilises ceric ion as a grafting initiator) it is warned that it is best not to exceed the gelatinisation temperature, to avoid possible degradation of polysaccharide.

Despite this warning against conducting polymerisation and gelatinisation substantially simultaneously some processes have been described in which it is required. In U.S. Pat. No. 3,640,925 combined gelatinisation of polysaccharide and graft polymerisation is achieved by rapidly heating an aqueous slurry of ungelatinised starch, monomer and initiator. For instance a slurry of about 5% ungelatinised starch, about 0.5% acrylamide, about 95% water, copper sulphate and peroxide initiator is substantially instantaneously heated in a starch cooker to cause gelatinisation and graft polymerisation. The product is described as a paste having 100% graft polymerisation.

In U.S. Pat. No. 4,322,472 a slurry is formed of, for instance, about 50% water, about 30% ungelatinised starch, about 7 to 10% acrylamide, cupric or other graft polymerisation initiator (except in the comparative example) and ammonium persulphate and sodium metabisulphite in amounts, respectively, of about 0.16% and 0.1% based on the weight of starch. Steam is injected into the slurry to heat it rapidly to about 95° C. in order to simultaneously gelatinise the starch and form the graft copolymer, although products having solution viscosities of 780 to 4,000 cps (as measured above) are said to contain a substantial amount of homopolymer. These products are pourable liquids. The highly oxidising initiator system and the other conditions prevailing in the reaction will probably have caused significant chemical degradation of the starch and will have resulted in any homopolymer chains being of low molecular weight.

It is also known to conduct polymerisation of monomer on to starch that has previously been gelatinised. Thus graft polymerisation in the presence of ceric ion on previously gelatinised starch is described in U.S. Pat. No. 4,400,496. Since gelatinised starch that has not been chemically degraded by oxidation, acid hydrolysis or other adverse reaction forms a very viscous solution and since it is necessary to mix the monomers and initiator intimately with the gelatinised starch it is necessary for the solution to be very dilute in order that its viscosity is relatively low. The total solids content therefore has to be very low and the process necessitates handling large volumes of liquid.

If it is desired to produce the polymeric product in the form of a dry powder it is often possible to convert the products obtained in the prior art into a powder but the conversion techniques are often inconvenient and difficult to operate. For instance in U.S. Pat. No. 4,400,496 a powder can be obtained by precipitation. It would be desirable to make a powder product of gelatinised polysaccharide and polymerised monomer, and especially such a product containing high molecular weight chains of the monomer, by a more direct and easy to operate route than has previously been available.

There are many instances where it would be desirable to use a gelatinised polysaccharide and a water soluble or swellable synthetic polymer in combination. It would be desirable to provide the combination in powder form but it is not practicable to provide a substantially homogeneous powder. If powdered polysaccharide and powdered polymer are blended the components are liable to separate on storage or transport. If solutions of polysaccharide and polymer are blended and are then dried, the drying necessitates high energy consumption. It would therefore be desirable to be able to produce a dry, substantially homogeneous blend.

Water soluble and swellable synthetic polymers can be made by reverse phase polymerisation of water soluble ethylenically unsaturated monomers or monomer blends but a simpler way of making them is by gel polymerisation, that is to say by polymerisation in bulk of an aqueous solution of polymerisable monomer to form a polymer gel. This gel is then converted to powder by comminution and drying. Although the process is commercially very convenient it does suffer from some disadvantages.

One disadvantage is that the polymerisation is exothermic and, in order that the exotherm in commercial scale processes does not become violent, it is necessary for the concentration of monomer in the solution to be kept reasonably low, generally below 40% by weight.

Another difficulty is that, as a result of the low amount of monomer, the gel necessarily contains a large amount of water and the drying therefore involves high energy costs.

Although gels that are sufficiently rigid that they can be easily comminuted are obtainable at very high molecular weights, the technique becomes unsuitable at lower molecular weights as the gel may be too soft to be comminuted or a flowable liquid is formed.

It is known to make solid products by polymerising highly concentrated monomer solutions (e.g., above 75% monomer) but these processes are difficult to perform satisfactorily due to the very high exotherm that is generated and tend to produce cross linked and/or low molecular weight products. True gel polymerisation is therefore preferred.

It would therefore be desirable to be able to produce more easily, and with less energy consumption, a powdered product that contains high molecular weight polymeric units of water soluble monomers or monomer blends and that has been made by gel polymerisation.

A process according to the invention for making a substantially homogeneous polymeric product comprising gelatinised polysaccharide units and units of polymerised water soluble ethylenically unsaturated monomer or monomer blends comprises heating a dispersion of particulate ungelatinised polysaccharide in aqueous monomer containing polymerisation initiator to a temperature above the gelatinisation temperature of the polysaccharide and thereby gelatinising the polysaccharide and gel polymerising the monomer, and in this process the final product is a water soluble or water swellable powder, the monomer undergoes exothermic polymerisation during the process and part at least of the heating is provided by the polymerisation exotherm, the polymerisation and gelatinisation results in the production of a comminutable gel, the gel is comminuted and the comminuted gel is dried to form the powder. Thus the process comprises forming the dispersion of ungelatinised polysaccharide, monomer and initiator, initiating the polymerisation and thereby releasing the exotherm, utilising the exotherm to gelatinise the starch (with or without additional heating), producing a comminutable gel as a result of the polymerisation and gelatinisation, comminuting the gel and then drying the comminuted gel to form a powdered product.

The gel, and therefore the powder, is a homogeneous product that is water soluble and/or water swellable. By saying that it is homogeneous we mean that particles formed from the gel will not separate readily into polysaccharide and synthetic polymer fractions and that upon mixing the particles with water one obtains an aqueous solution and/or aqueous dispersion of swollen particles with substantially no separation of insoluble material. The swellable particles, if present, will swell greatly in the presence of water, and will generally contain at least 10 parts and often at least 20 parts, by volume water per part dry volume when swollen. The powder is often a blend of water soluble and water swellable materials so that upon mixing with water one obtains water swollen particles dispersed in a solution of dissolved material. The powder often contains substantial amounts of water soluble synthetic polymer, i.e., formed solely from the polymerisable monomer. If there is a single monomer, the polymer is a homopolymer. Generally it is substantially linear. The amount is typically 1 to 40% by weight dry solids. The product may include ungrafted gelatinised polysaccharide, for instance in an amount below 50% and generally below 25% by weight dry solids. Also the product may include some grafted polysaccharide but the amount of grafting is generally relatively low since the conditions during the polymerisation do not favour grafting.

In the products obtained by the process of the invention most of the hydroxyl groups of the polysaccharide preferably remain unsubstituted. If every hydroxyl position in the polysaccharide was substituted the degree of substitution would be 3 but in the invention it is preferably below 0.2, generally below 0.1 and most preferably below 0.05. Generally the amount should be as low as possible but sometimes it is above 0.0001, perhaps above 0.001.

The precise nature of the preferred products is not entirely clear. We believe that predominantly they are a physical homogeneous mixture of gelatinised polysaccharide and synthetic polymer but there may be low amounts of graft copolymer, as discussed above. Also it is possible that during the gel polymerisation cross-linking between the two polymeric species, (i.e. synthetic polymer and polysaccharide) for example by normal condensation-type reactions, chain transfer of a growing polymer chain on to an anhydroglucose unit of the polysaccharide or by grafting, as discussed above, may occur depending on for instance pH, temperature, monomer type, initiator, etc.

The water soluble polymerisable material may consist of one or more monomers, or prepolymers formed from one or more monomers, provided the prepolymer does not make the solution too viscous to permit easy admixture of the polysaccharide into the solution.

The monomers are usually water soluble ethylenically unsaturated monomers and generally comprise acrylic monomers. Water soluble blends of monomers may be used. Suitable non-ionic acrylic monomers include acrylamide and methacrylamide. Suitable anionic acrylic monomers include acrylic acid and methacrylic acid and their sodium or other water soluble salts. Suitable cationic acrylic monomers include amino alkyl esters of acrylic or methacrylic acid, especially the dialkyl aminoalkyl esters such as dialkyl amino ethyl acrylate, together with the free acid and quaternary ammonium salts of these. Other suitable cationic monomers include amino alkyl derivatives of acrylamide, including the free acid and quaternary ammonium salts of these derivatives. Ionic monomers are usually copolymerised with non-ionic comonomers, for example, acrylamide or methacrylamide. Such mixtures of monomers may for instance comprise up to 50% or more by weight ionic monomer based on the total weight of monomer, usually up to 30%, with the rest being (meth) acrylamide.

The water insoluble polysaccharide is generally a starch but other cold water insoluble, hot water soluble polysaccharides can be used either alone or blended with starch. Such other materials include starch derivatives such as starch esters or ethers, especially starch acetate, insoluble dextrins, cold water insoluble, hot water soluble gums such as tamarind kernel powder, galactomannans such as locust bean gum and blends, for instance blends of xanthan and locust bean gum.

As a result of including the polysaccharide in insoluble form, the admixture of this with the aqueous solution of polymerisable material to form a uniform dispersion is relatively easy, since the polysaccharide does not result in an unacceptable increase in viscosity. The polysaccharide must therefore be insoluble and either will not swell at all in the solution or will swell by an amount that is insufficient to cause an unacceptable increase in viscosity, for instance absorbing not more than 2 or 3 times its volume of solution.

The polysaccharide used in the invention generally has a particle size between 1 and 100 $\mu$m since smaller particles may create dusting and mixing problems and larger particles may result in inadequate gelatinisation, unless special processing steps are incorporated.

The fluid dispersion is generally formed merely by mixing dry polysaccharide particles into the aqueous solution of water soluble polymerisable monomer. The viscosity of the fluid dispersion should be sufficiently low that mixing of the particles into the dispersion can be conducted easily using a conventional stirrer and such that the resultant solution can be deoxygenated.

The process is preferably conducted in a manner similar to a conventional gel polymerisation process for polymerising the monomers, but with the added polysaccharide. Accordingly the polymerisation should be conducted using initiators and other process conditions that are typically used for making gel polymers. In particular the process should be conducted using an initiator system that promotes the formation of homopolymerisation in preference to graft polymerisation on to the polysaccharide. Accordingly the initiators should not be materials that will preferentially form radicals on the anhydroglucose unit although a small amount of radical formation, and thus grafting, may be tolerable. Similarly the initiation system and other processing conditions should not be such as to chemically degrade the polysaccharide or polymer, for instance by acid hydrolysis or oxidation, since if such degradation occurs the desired comminutable gel will not be obtained.

The process should therefore be conducted in the substantial absence of ceric ion or any of the other multivalent metal or other initiator systems that are known to promote graft polymerisation in preference to homopolymerisation. The process should be conducted at conventional gel polymerisation pH values, typically 4 to 9 and preferably 5 to 8, so as to minimise the risk of acid hydrolysis, and thinning, of the polysaccharide units. The process should be conducted in the absence of amounts of oxidising agents that will degrade the polysaccharide. Thus although oxidising agents may form part of the initiator system their amount should be relatively low so as to avoid undersired oxidation and degradation of the polysaccharide. Typically if any polyvalent metal ion is present its amount should be below about 0.01%, generally below 0.005%, by weight and if oxidising agent is present its amount should generally be below 0.1% and preferably below 0.05% by weight of the aqueous polymerisation mixture.

Suitable conventional gel polymerisation initiators are used. The preferred initiators are thermal initiators, especially azo-type thermal initiators in conjunction with low levels of redox initiators. Even though the redox initiator may contain multivalent metal ions and the oxidising reactant may react with the anhydroglucose units as well as the reducing reactant, the amounts of redox initiator are so low that they would not be expected to be capable of causing any substantial grafting and the azo-type thermal initiators have not been reported as being efficient grafting initiators. The redox initiator initiates polymerisation whilst the temperature of the reaction mixture is still below the temperature required for the thermal initiator to react. As the polymerisation exotherm raises the temperature of the reaction mixture the thermal initiator becomes effective.

Polymerisation is preferably conducted in the presence of a reducing agent so that any oxidising radicals, for instance from the initiator, will reduce the reducing agent in preference to attacking the anhydroglucose units and thereby initiate graft polymerisation and/or degrade the polysaccharide.

Some of the heating required to raise the mixture from ambient temperatures to above gelatinisation temperature may be provided by external heating. For instance the mixture may be heated to near, but not above, gelatinisation temperature by external heating such as steam injection. Preferably substantially all, and generally all, the heating of the mix between the temperature at which polymerisation starts and gelatinisation temperature is due to the exotherm. Thus although polymerisation may be initiated at an elevated temperature, for instance up to 50° C. it is preferably initiated at a lower temperature, generally below 30° C., and the exotherm then elevates the temperature of the reaction mixture to above the gelatinisation temperature, generally between 65° and 100° C. For instance once polymerisation initiates the exotherm will occur and the polymerisation will terminate spontaneously and the temperature start to drop after a period that is generally from 10 minutes to 6 hours, usually 15 minutes to 4 hours, from initiation.

The polymerisation temperature preferably rises to between 60° and 99° C., generally 65° to 90° C. and the proportions of monomer, water and polysaccharide are preferably selected so as to obtain the desired maximum temperature. The maximum gel temperature seems to affect the properties of the final product, and in particular the rheology of the product. This is an indication that cross-linking by normal condensation-type reaction may be occurring between the two polymeric species or between chains of synthetic polymer during the gel polymerisation, and in particular during the high temperature part of the gel polymerisation. For instance the rheology of aqueous dispersions of products prepared from acrylamide, sodium acrylate and starch in identical gel polymerisations except for final gel temperature (78°, 82°, 86° C.) changed from highly viscous and slight viscoelastic (long flow) at the lower temperatures to less viscous and very short flow at the higher temperature, indicating increased cross linking.

When maximum solubility is required it is desirable for the gel temperature to be kept low, for instance below 80° and often below 75° C. but when a swellable rather than soluble product is required, and probably therefore when some cross linking or grafting is permissible, higher temperatures are suitable.

The amount of polymerisable material in the dispersion should be sufficient that the exotherm will raise the temperature of the reaction medium to the desired level and gelatinise the polysaccharide. It is generally similar to the amount typically present in the solutions of conventional gel polymerisation processes. For instance the dispersion will generally contain at least 10%, often at least 15% and frequently at least 20% by weight monomer but will generally not contain more than 40% by weight monomer although in some instances amounts up to 50% may be possible. Whereas in conventional gel polymerisation processes the balance, to 100%, of the polymerisation mixture is provided by water (and minor additives such as polymerisation initiators) in the invention the balance is provided by a blend of polysaccharide and water. The total amount of polysaccharide may be from 1 to 60% by weight of the total dispersion. Although it is sometimes useful to have polysaccharide amounts as low as, say, 3% it is generally preferred that the amount of polysaccharide should be at least 10% by weight of the dispersion with amounts of 15 to 50% generally being optimum. The amount of water in the dispersion is generally in the range 25 to 75%, most commonly 40 to 60% by weight of the dispersion.

The amount of polymerisable material, per part by weight polysaccharide, is normally at least 0.3 parts, and generally at least 0.5 parts by weight. Preferably it is at least 1 part and may be up to, for instance, 10 parts although usually it is from 1 to 5 parts by weight.

It is generally desired that there should be a substantially uniform temperature throughout the mass that is being polymerised and this may be promoted by applied cooling, by insulation of the reactor vessel or by external heating designed to raise the parts of the mass that would otherwise be air cooled, i.e., near to the walls of the reaction vessel, to a temperature similar to the temperature prevailing in the centre of the mass.

The desired polymerisation is generally induced in the same way as conventional gel polymerisation at ambient temperature. For instance the aqueous dispersion is generally first deoxygenated, for instance by passing nitrogen through it in the same way as aqueous monomer solutions are deoxygenated before conventional gel polymerisation. This is in marked contrast to processes in which dissolved polysaccharide is present in the monomer solution in concentrations higher than about 5% or less by weight since such solutions have a viscosity that is too high to permit deoxygenation in this manner.

Initiator is generally added after the deoxygenation, the manner of addition being conventional for gel polymerisation. This again is impossible in processes conducted in the presence of dissolved polysaccharide since it is impossible to obtain uniform distribution of the initiator in the resultant viscous solutions. Molecular weight regulators may be added, for instance with the initiator. Polymerisation will normally occur spontaneously upon deoxygenation and addition of initiator, usually at first by a redox initiation system. The reaction generates the exotherm that gelatinises the polysaccharide.

The proportions and conditions must be such that the gel that is obtained by the polymerisation is a comminutable gel. If the gel that is obtained is insufficiently rigid then the proportions or process conditions must be modified in order to produce a gel that is sufficiently rigid. For instance the amount of water may be reduced, the amount of monomer may be increased, additional reducing agent may be added or the amount of oxidising agent, graft polymerisation initiator, polyvalent metal ion or acid may be reduced so as to reduce grafting and polysaccharide degradation. Provided the gel that is obtained is comminutable it is possible for the process to be conducted under conditions such that a substantial amount of graft polymerisation and/or cross linking has occurred but, as indicated above, it is generally preferred that the polymerisation is substantially homopolymerisation or copolymerisation, preferably linear.

Another way of increasing the rigidity and comminutability of the gel is by including an unreactive particulate material in the reaction mixture and this reactive material may be utilised to control the exotherm, for instance as described in EP No. 0123486.

The characteristics of the gel obtained in the invention should, as regards rigidity and comminutability, be generally similar to those that are known to be required for comminution of gels made solely from water soluble monomers and monomer blends. If the gel is insufficiently rigid it will be impossible to comminute it and dry it as a powder, since the gel particles will agglomerate immediately after comminution. Communition may be in air as is conventional, for instance it may be comminuted by a conventional chopper or extrusion device. It may then be dried in an oven. Comminution is preferably conducted while the gel is still hot, followed by air drying, optionally followed by further comminution and air drying in either order. Instead of drying with air, it may be comminuted and dried in methanol.

Alternatively some or all of the comminution or drying may be effected by milling in an aqueous medium of an equilibrating agent and/or extracting water from the gel into an aqueous solution of an equilibrating agent, as described in European patent application No. 85304517.7. A suitable equilibrating agent when the monomers are anionic is low molecular weight (typically about 4,000) sodium polyacrylate whilst a suitable equilibrating agent when the monomers are cationic is polydiallyldimethyl ammonium chloride. Other anionic or cationic polymers can be used instead. The amount of equilibrating agent is usually at least 0.5 parts per part by weight synethetic polymer. The amount of aqueous medium is usually at least 1 part per part by weight synthetic polymer.

The water content of the dried particles is generally from 0.1 to 15%, preferably 5 to 10% by weight of the particles. The particles generally have a particle size between 50 microns and 2 mm, preferably 100 to 700 microns but can, for instance, be as small as 10 microns or as large as 5 mm.

One advantage of the invention is that the gel can contain the same amount of synthetic polymer as a conventional gel but much less water, since some of the water that is conventionally present has been replaced by polysaccharide. ACcordingly less dry ing energy is required. Another advantage of the invention is that the presence of the polysaccharide renders the gel more rigid, and therefore easier to comminute, than gels that consist of the corresponding synthetic polymer, at a given molecular weight. This is a particular advantage for low molecular weight polymers, for instance having intrinsic viscosity below 5. For instance, polymers that previously might not have provided a comminutable gel (e.g., having IV as low as 1) can now be provided as a comminutable gel.

Another advantage is that, for the first time, it is possible to obtain in an economic manner a dry homogeneous product that is soluble or swellable and that includes polysaccharide and high molecular weight polymerised units, generally partly or wholly as homopolymer.

Accordingly the invention offers considerable energy savings and provides a dry product that can rely for its utility primarily or wholly upon the synthetic component or that can rely for utility upon both the synthetic and the polysaccharide components.

The use of the final product will depend upon the choice of polymerisable material, polysaccharide and their porportions and, in particular, upon the molecular weight of the synthetic polymer. This can be controlled in the invention in conventional manner by appropriate choice of the initiator and molecular weight regulator systems. In general, the products can be used wherever the corresponding synthetic polymers could have been used provided the presence of polysaccharide would not have been deleterious. For instance the products can be used as viscosifiers, textile sizes, dry strength resins flocculants, filtration aids and mineral depressants.

In many applications the properties of the polysaccharide component may be beneficial, for example in flucculants, mineral depressants, viscosifiers and adhesives.

An especially preferred use of the new product is as an aqueous adhesive, for example for wallcoverings. Preferred products comprise a blend of soluble linear polymer (typically 1 to 40% by weight) and gelatinised polysaccharide, optionally carrying grafted polymeric units. The soluble polymer component provides initial tack whilst the gelatinised component provides permanent adhesion on drying. The product may be dispersed into water to provide a brushable wallpaper paste or may be applied to the back of a wallcovering as a pre-paste.

Aqueous dispersions of the product have good pasting characteristics and excellent wet and dry adhesion to plaster and even on alkyd matt and gloss painted surfaces. The properties of the products are comparable with those of commercially available wallpaper pastes consisting of methyl cellulose, but are commercially preferable to produce since they are based on starch and synthetic monomer. Prior to the invention wallpaper pastes based on starch had inferior properties compared to those based on methyl cellulose.

Particularly suitable dry strength resins are products formed from 1 part by weight starch or other polysaccharide with 1 to 3, generally about 2, parts by weight of a low molecular weight cationic copolymer having intrinsic viscosity of from 2 to 6. Suitable filtration aids, for instance in aluminium recovery, are made from about 1 part starch or other polysaccharide and 0.5 to 2 parts, generally about 1 part, by weight of a polyacrylate copolymer having intrinsic viscosity around 5. Mineral depressants in flotation may be formed of starch with low molecular weight anionic copolymers. Cationic flocculants may be formed from 1 part by weight starch or other polysaccharide with 5 to 15, generally about 10 parts by weight of a cationic polymer generally having intrinsic viscosity above 10. Textile sizes may be formed of starch or other polysaccharide with a low molecular weight polymer of the type conventionally used in textile sizes.

The following are some examples of the invention. All amounts are by weight unless otherwise specified.

EXAMPLE 1

An aqueous monomer suspension was prepared by mixing the following:
27.9 part: 50% aqueous half-neutralised sodium acrylate
1 part: deionised water
6 part: maize starch.

The smooth non-viscous dispersion was cooled to 15° C., transferred to a Dewar flask and $N_2$ gas bubbled through the mixture for 20 minutes, keeping the insoluble starch granules in suspension. Polymerisation was initiated by addition of 2-mercaptoethanol (0.035 part, 10% solution), a thermal initiator (2,2'-azobis-(2-aminopropane) hydrochloride, 0.21 part, 5% solution), potassium bromate (0.35 part, 1% solution) and sodium sulphite heptahydrate (0.47 part, 3% solution).

Polymerisation began immediately, the increased viscosity preventing the starch granules sedimenting. An 84° C. exotherm was obtained in 30 minutes.

The contents of the flask were allowed to cool (17 hours) and the firm rigid gel which resulted was cut into small pieces (approximately 1 g), minced and oven dried at 80° C. The dried granules were milled and sieved to minus 710 micron.

The white, homogeneous-looking powder was freely soluble in cold water at 5% giving a slightly viscous, slightly viscoelastic, and only slightly hazy solution. The polymer had an intrinsic viscosity (I.V.) of 1.9 dl/g. When the similar gel polymerisation was conducted in the absence of the starch the product was a viscous liquid that could not be comminuted as a gel.

EXAMPLE 2

The product from Example 1 was tested for properties associated with a good textile size.

Films were cast from a 4% solution. Strips were then cut from these films and conditioned for 48 hours at 65% and 75% relative humidity. The conditioned strips were tested on an Instron IMM-1101 (Instron Ltd., U.K.) and from an average of ten measurements the film was found to have the tensile properties shown in the table.

|  | Relative Humidity | |
| --- | --- | --- |
|  | 0.65% | 75% |
| Breaking Load (kg) | 0.71 | 0.21 |
| Extensibility (%) | 148 | 278 |
| Tensile strength (kg mm$^{-2}$) | 1.86 | 0.43 |

The time taken for films to re-dissolve after heating for 1, 2 and 5 minutes at 110°, 140° and 170° was also tested.

| Temp/°C. | Heating time/min | Time to dissolve/min |
| --- | --- | --- |
| 110 | 1 | 1.7 |
|  | 2 | 1.5 |
|  | 5 | 1.8 |
| 140 | 1 | 2.0 |
|  | 2 | 2.0 |
|  | 5 | 1.7 |
| 170 | 1 | 2.3 |
|  | 2 | 2.2 |
|  | 5 | 4.0 |

These results compared favourably with a commercially available textile size tested in the same manner.

EXAMPLE 3

An aqueous monomer suspension was prepared by mixing the following:
45.3 part: 51% aqueous acrylamide
22.6 part: 72.4% aqueous dimethylaminoethyl acrylate quaternised with methyl chloride
21.9 part: deionised water
14 part: maize starch.

Caustic soda (46% solution) was added to adjust the pH to 4.0. This mixture was purged with $N_2$ and polymerised as described in Example 1 with 2,2'-azobis-(2-aminopropane) hydrochloride (0.56 part, 5% solution) potassium bromate (0.225 part, 0.5% solution) and sodium sulphite heptahydrate (0.225 part 2% solution), giving an exotherm 75° C. in 27 minutes.

The firm rigid gel thus produced was processed as in Example 1 to give a powder freely soluble in cold water at 1%. The solution was almost clear, slightly viscous and slightly viscoelastic. The polymer had an I.V. of 3.3 dl/g. When the process was repeated in the absence of the starch the product was a soft sticky gel that could not satisfactorily be comminuted and dried.

EXAMPLE 4

The product from Example 3 was tested as a dry strength resin in paper manufacture. Handsheets (1.5 g) were made (TAPPI method T205) using standard waste stock to which the cationic polymer mixture was added at 0.2% dw/w and 0.4% dose levels. Average burst strength increases for the additive compared with a control was 16.3% and 22.5% for the two dose levels respectively.

EXAMPLE 5

An aqueous monomer suspension was prepared by mixing the following:
24.3 part: 37% aqueous sodium acrylate
4.43 part: deionised water
1 part: wheat starch.

This mixture was polymerised as in Example 1 by addition of 2,2'-azobis-(2-aminopropane) hydrochloride (0.18 part 5% solution), ammonium persulphate (0.03 part, 0.5% solution) and ammonium ferrous sulphate (0.03 part, 0.35% solution). The resulting very firm gel was allowed to cool and was processed as before without difficulty.

A 1% aqueous solution of this product in 4 g/l NaOH was clear, very viscous and viscoelastic and free of insoluble lumps. When the process was repeated in the absence of starch the gel had a serious tendency to agglomerate when comminuted and for the particles to cake on drying.

EXAMPLE 6

The product from Example 5 was tested for its flocculant activity on 2% caustic china clay. Settlement rates of 29.4 m/h and 72.8 m/h were obtained at 6 ppm and 7.5 ppm doses respectively, compared with settlement rates of 32.4 m/h and 69.3 m/h for the equivalent dosages of a non starch-containing control showing that the starch was not having a measurable deleterious effect on flocculant activity (but had been useful in processing).

EXAMPLE 7

An aqueous monomer mixture pH 7 was prepared by suspending ungelatinised starch acetate granules (2.50 parts:Kollotex 750, Tunnel AVEBE Starches Ltd.) in a solution of acrylamide (1.62 parts) and sodium acrylate (1.00 parts) in water (6.28 parts). Thermal initiator 2,2-azobis-(2-aminopropane) hydrochloride (0.0034 parts) was dissolved in the non-viscous suspension, which was de-oxygenated by passage of $N_2$ for 15 minutes.

Polymerisation was initiated by addition of ammonium persulphate (0.0011 parts) and ferrous ammonium sulphate (0.00008 parts) and the walls of the vessel containing the mixture were prevented from being cooled by immediately placing the vessel in an oven at 90° C. After 60 minutes the gel had an even temperature throughout of 87° C. After a further 2 hr. at this temperature, the resulting firm, rubbery gel, was cut into strips, minced and dried at 80° C. The dried granules thus obtained were ground and sieved through a 150 micron mesh to give Product I.

A comparison of the viscosity and paste characteristics was made of aqueous dispersions containing Product I and each of the following polymers or blends of polymers:

(a) a high molecular weight copolymer of acrylamide (66%) and sodium acrylate (34%);
(b) gelatinised Kollotex 750, a starch acetate;
(c) a blend of gelatinised Kollotex 750 (150 parts) and polymer a (50 parts);
(d) a graft copolymer composed of gelatinised Kollotex 750 (50 parts) acrylamide (30 parts) and sodium acrylate (20 parts) made at 3% overall concentration according to the method of Butler (U.S. Pat. No. 4,400,496) using Ce IV initiator. Polymer was recovered from the gelled reaction mixture by precipitation with acetone (5 volumes), drying the precipitate in vacuo, milling and sieving through a 150 micron mesh.
(e) methyl cellulose based commercially available wallpaper paste (Perfax Metyl Speciaal; SA Henkel).

At all concentrations examined (1%, 2%, 3% and 4%) samples (a) (c) and (d) gave solutions which were stringy and elastic and, therefore unsuitable for application to wallcoverings by brush.

At 3% concentration, typical for wallcovering adhesives, samples (b) had a viscosity of only 350 cP when measured on a Brookfield RVT, spindle no.6 at 20 rpm, compared with 8400 cP and 19500 cP for sample (e) and Product I respectively. Sample (b) was, therefore, quite different from Product I and quite unsuitable without further modification as a wallcovering adhesive. Sample (e) and Product I, however, had good pasting characteristics and were both shown to give excellent wet adhesion between anaglypta paper and a matt alkyd paint surface. The dry adhesion of Product I on the paint surface was found to be superior to that of sample (e).

EXAMPLE 8

In a manner similar to Example 3 polymerisation was conducted of a dispersion containing 50% potato starch, 20% monomer and 30% water in the presence of 12 ppm potassium bromate, 48 ppm sodium sulphite and 300 ppm azo initiator. The final polymerisation temperature was 95° C. and the gel was hard. The polymer had IV of 1.1 dl/g.

EXAMPLE 9

A process similar to Example 5 was conducted using a dispersion of 16.7% maize starch, 23% of a blend of acrylamide and sodium acrylate, 0.3 ppm ferrous ammonium sulphate, 15 ppm ammonium persulphate and 300 ppm azo initiator. The final gel temperature was 97° C. and the final gel was firm. The IV of the product was 11.5.

We claim:
1. A process of making a substantially homogeneous polymeric product comprising gelatinised polysaccharide units and units of polymerised water soluble ethylenically unsaturated monomer or monomer blend by heating a dispersion of particulate ungelatinised polysaccharide in aqueous monomer containing polymerisation initiator to a temperature above the gelatinisation temperature of the polysaccharide and thereby gelatinising the polysaccharide and gel polymerising the polymer, in which the dispersion comprises 10 to 50% by weight monomer, 3 to 60% by weight polysaccharide and 25 to 75% by weight water and the amount of monomer in the dispersion is 0.3 to 10 parts by part by weight polysaccharide and the product is a water soluble or swellable powder, the monomer undergoes exothermic polymerisation during the process and part at least of the heating is provided by the polymerisation exotherm, the polymerisation and gelatinisation results in the production of a comminutable gel, the gel is comminuted and the comminuted gel is dried to form the powder.

2. A process according to claim 1 in which substantially all the heating of the mix between the temperature at which the polymerisation starts and the gelation temperature is due to the exotherm.

3. A process according to claim 1 in which the polymerisation is initiated at a temperature below 50° C., preferably below 30° C., and the exotherm raises the temperature to between 65° and 99° C.

4. A process according to claim 1 in which the initiator is an initiator that promotes homopolymerisation in preference to graft polymerisation on to the polysaccharide.

5. A process according to claim 1 in which the dispersion includes below 0.1% oxidising agent, below 0.01% polyvalent metal ions, and includes reducing agent.

6. A process according to claim 1 in which the initiator system comprises a thermal initiator, with a redox initiator and includes a reducing agent.

7. A process according to claim 1 in which the dispersion contains % by weight water, by weight polysaccharide and 15 to 40% by weight monomer.

8. A process according to claim 1 in which the polysaccharide is selected from starch, starch esters, starch ethers, insoluble dextrins, xanthans and locust bean gum.

9. A process according to claim 1 in which the monomers are water soluble acrylic monomers preferably selected from (meth) acrylamide, (meth) acrylic acid and its water-soluble salts, aminoalkyl esters of (meth) acrylic acid, especially dialkyl aminoalkyl esters and their acid and quaternised derivatives, and aminoalkyl acrylamide derivatives and their acid and quaternised derivatives, and mixtures hereof.

10. A method in which wallpaper is bonded to a wall using an aqueous dispersion of particulate adhesive or a particulate prepaste adhesive wherein the particulate adhesive is a substantially homogeneous water swellable and water soluble polymeric product made in accordance with the process of claim 1 comprising 1 to 40% water soluble synthetic polymer, and swellable gelatinised polysaccharide optionally grafted with synthetic polymer.

11. A product obtained by a process according to claim 1.

12. A product obtained by a process according to claim 2.

13. A product obtained by a process according to claim 3.

14. A product obtained by a process according to claim 4.

15. A product obtained by a process according to claim 5.

16. A product obtained by a process according to claim 6.

17. A product obtained by a process according to claim 7.

18. A product obtained by a process according to claim 8.

19. A product obtained by a process according to claim 9.

* * * * *